US005207154A

United States Patent [19]

Bonnet

[11] Patent Number: 5,207,154

[45] Date of Patent: May 4, 1993

[54] PROCESS FOR PRESSING AGRICULTURAL PRODUCTS TO EXTRACT JUICE AND DEVICE FOR USING PROCESS

[75] Inventor: Jean Bonnet, Angers, France

[73] Assignee: Constructions Meca-Metalliques Chalonnaises S.A., Chalonnes sur Loire, France

[21] Appl. No.: 793,021

[22] Filed: Nov. 15, 1991

[30] Foreign Application Priority Data

Nov. 16, 1990 [FR] France ................................ 90 14488

[51] Int. Cl.[5] ........................ A23N 1/00; B30B 9/06; B30B 15/26

[52] U.S. Cl. ........................................ 100/37; 99/486; 99/495; 100/43; 100/99; 100/104; 100/116; 100/211; 426/478

[58] Field of Search ................. 99/485, 486, 495, 509, 99/510; 100/37, 43, 45, 48, 50, 99, 110, 113, 104, 116, 131, 126–129, 211; 426/478, 489; 68/242

[56] References Cited

U.S. PATENT DOCUMENTS

| | | | |
|---|---|---|---|
| 4,062,213 | 12/1977 | Schneider et al. | 100/43 |
| 4,249,400 | 2/1981 | Arendt | 68/242 |
| 4,323,007 | 4/1982 | Hunt et al. | 100/37 |
| 4,350,089 | 9/1982 | Braun | 100/116 |
| 4,365,547 | 12/1982 | McClure, Jr. | 100/43 |
| 4,387,634 | 6/1983 | Balass | 100/211 |
| 4,429,627 | 2/1984 | Edso | 100/35 |
| 4,643,088 | 2/1987 | Kollmar | 100/37 |
| 4,723,429 | 2/1988 | Weber et al. | 100/99 |
| 4,955,214 | 9/1990 | Geiger | 100/110 |
| 5,001,911 | 3/1991 | Eck et al. | 100/116 |

FOREIGN PATENT DOCUMENTS

| | | | |
|---|---|---|---|
| 8802223 | 4/1988 | PCT Int'l Appl. | 100/104 |
| 0644634 | 1/1979 | U.S.S.R. | 100/99 |

*Primary Examiner*—Timothy F. Simone
*Attorney, Agent, or Firm*—Edmund M. Jaskiewicz

[57] ABSTRACT

Process and apparatus for the control and the adjustment of a press during a juice extraction operating having at least one pressure increase sequence and measuring and comparing to a predetermined value the rate or the amount of liquid extracted before, during or after the pressing, or the partially pressed materials to be pressed remaining in the press after the pressing, and then using the resulting value of the difference of the rates or the amounts of extracted liquid and the value of the expected rates or amounts or the amount of materials to be pressed remaining in the press, if applicable, partially pressed, to begin, continue, interrupt, modify or complete the process of extracting the juice. The process is at least partially programmed.

29 Claims, 4 Drawing Sheets

PD
PD
$D_M(n+1)$
$K \times D_M(n)$
$D_m(n)$
$D_1$
$D_F$
$D_0$
t
$T_L$
$P_{n+1} = P_M$
$P_n$
$P_{n-1}$
$P_{n-2}$
$t_n$
$t_{n-1}$
$t_{n-2}$
$D_M(n-1)$
$K \times D_M(n-1)$
$D_M(n)$
$D_m(n-1)$
$D_1$
$D_0$

PROCESS FOR PRESSING AGRICULTURAL PRODUCTS TO EXTRACT JUICE AND DEVICE FOR USING PROCESS

BACKGROUND OF THE INVENTION

The present invention relates to the extraction of juices from agricultural products, more particularly, to a process and a device for controlling a press.

FIELD OF THE INVENTION

Various types of presses are known and have been used in the extraction of juices of various forms of agricultural products. One type of such a press has a flexible pressing element or membrane. These membranes, which may be of many shapes, are actuated in response to a fluid under pressure whose pressure can be controlled. Introduction of such a fluid under pressure, which may include air, water or other fluids, actuates the membrane as a pressing element in a receptacle which receives the materials or products from which it is desired to extract liquids.

DESCRIPTION OF THE PRIOR ART

Several pressing processes, to control presses, also already exist.

In general, these known pressing processes include several preset pressure stages. At the end of the holding period of each pressure stage, a decompression of the press and a stirring of the materials are performed. Nevertheless, pressing processes are also known for which several pressure increases can follow one another without intermediate stirring. The various parameters of the pressing cycles of these known processes are determined experimentally by the operator of the press, then programmed and fully reproduced by the automatic action of the presses.

Consequently, each time that the nature of the materials to be pressed, such as, for example, the maturity and the variety for fruits, varies, the user has to redetermine the parameters to have a suitable pressing cycle. This determination being very long (one pressing cycle lasts, in general, between 1 and 4 hours), the user rarely spends the time necessary to determine suitable parameters. Further, the user does not always have the experience or the competence necessary for the optimization of the automatic pressing cycle that the press will have to reproduce. Further, the programmed parameters are set and can be modified during a pressing cycle, as a function of the course and the evolution of said pressing, only by the user.

SUMMARY OF THE INVENTION

The principal object of the present invention is to provide a novel and improved pressing process wherein it is possible to determine automatically, without the intervention of the operator, the working pressure stages of the press, the holding periods of these pressure stages, the linkage or relationship of several pressure stages, the occurrence of decompression phases of the press, and the intensity of the stirring of the pressed materials during the decompression phases, i.e., all of the parameters which define the course of a pressing cycle, as a function of the evolution of the pressing.

Further, according to this process, a better quality juice will be obtained, as well as a more efficient processing of the materials to be pressed as a result of a more effective process for pressing of the materials.

This problem is solved, according to the present pressing process, in such a manner so as to make possible the control and the adjustment of a press during a juice extraction operation comprising at least one pressure increase sequence, to separate the solid and liquid materials of agricultural products such as, for example, grapes, berries, fruits or vegetables, by a pressing element able to be driven in a receptacle. The process consists in measuring and comparing to an expected or predetermined value the rate or the amount of liquid extracted before, during or after the pressing or the partially dried materials to be pressed remaining in the press after the pressing, and in using the resulting value of the difference of the rates or the amounts of extracted liquid and the value of the expected rates or amounts, or the amount of materials to be pressed remaining in the press, if applicable, partially pressed or dried, to begin, continue, interrupt, modify or complete the process of extracting the juice, said process being at least partially programmed.

The invention also has as its object to provide a device for the use of the automatic pressing process, which comprises a programmable automaton controlling, in particular, a device for supplying the press with pressurized fluid and a motor for driving in rotation the tank of the press, a pressure sensor measuring the pressing pressure and a flowmeter placed downstream from the orifice for evacuating extracted liquids, and, finally, an operator's console making it possible to set the maximum period of a pressing cycle as well as the value of at least one factor influencing said cycle.

BRIEF DESCRIPTION OF THE DRAWING

The invention will be understood better thanks to the description below, which relates to a preferred embodiment, given by way of nonlimiting example, and explained with reference to the accompanying diagrammatic drawings, in which.

DESCRIPTION OF THE PREFERRED EMBODIMENTS

Figure 1:
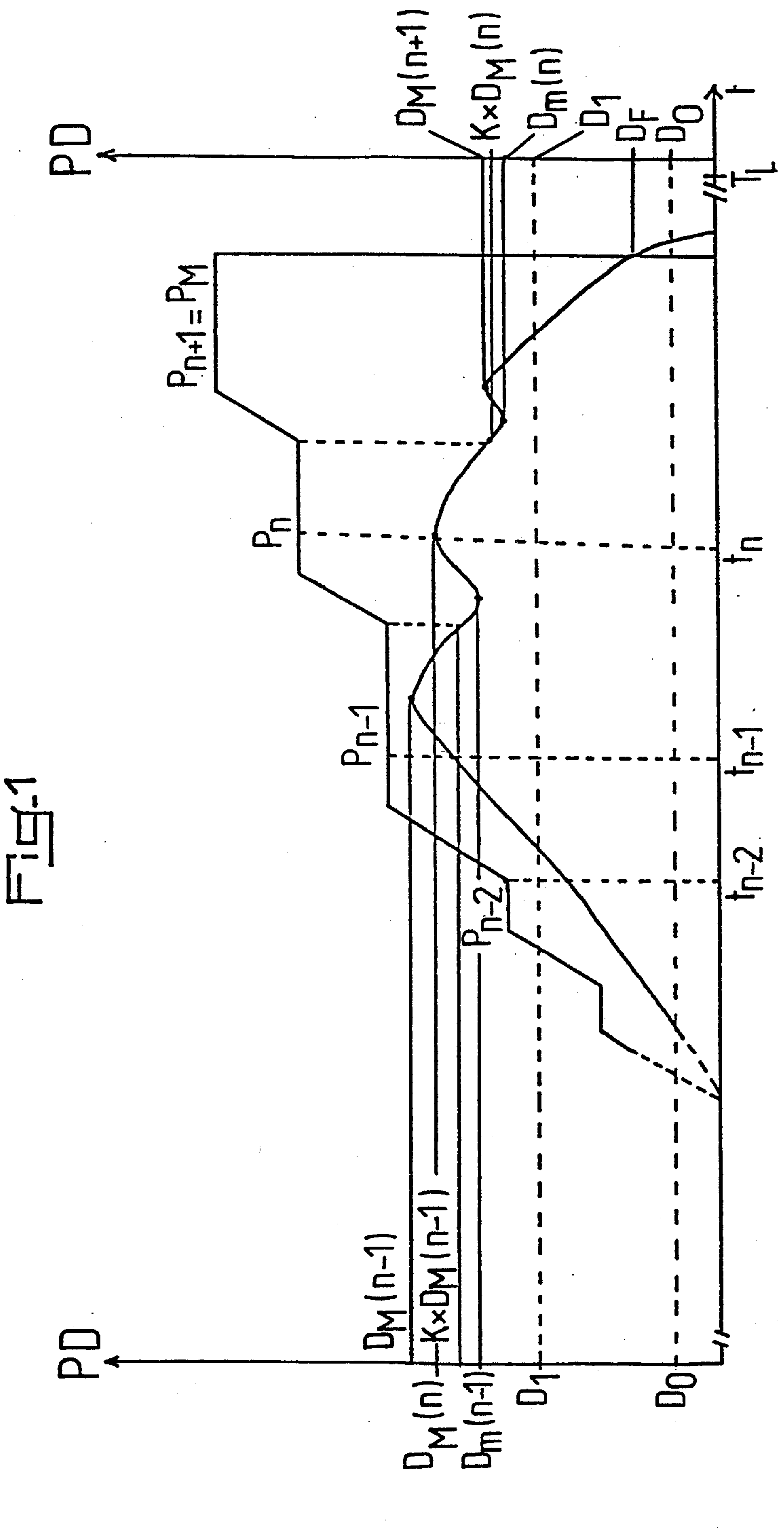
FIG. 1 represents the curves of evolution of the pressing pressure and the flow rate of the liquids extracted during a pressure increase sequence.

According to the invention, the pressing process consists in measuring and in comparing with an expected value the rate or the amount of liquid extracted before, during or after the pressing or the partially dried materials to be pressed remaining in press 1 after the pressing, and in using the resulting value of the difference of the rates or amounts of extracted liquid and the value of the expected rates or amounts, or the amount of materials to be pressed remaining in press 1, if applicable, partially dried, to begin, continue, interrupt, modify or complete the process of extracting juice, said process being at least partially programmed.

In this description, $S_n$ designates a pressure increase sequence of any type of a pressing operation. Said sequence $S_n$ is, if applicable, preceded by a prior sequence $S_{n-1}$ and followed, optionally, by a subsequent sequence $S_{n+1}$. Also, $P_n$ designates any pressure stage of any pressure increase sequence $S_n$. Pressure stages $P_{n-1}$ and $P_{n+1}$ are, if applicable, pressure stages that are respectively lower than and higher than pressure stage $P_n$. Further, $P_{n-2}$ and $P_{n+2}$ designate, if applicable, pressure stages that are respectively lower than pressure stage $P_{n-1}$ and higher than pressure stage $P_{n+1}$. Similarly, $P_1$ designates the first pressure stage of a pressure increase sequence $S_n$ of any type, and $P_2$, $P_2$, $P_3$, $P_4$, etc . . . designate the following respective pressure stages. The values of these pressure stages are all between the minimum and maximum values of the pressing pressure able to be obtained and maintained by press 1, the staging and the total number of these stages may be varied according to the specific application of a particular pressing operation.

According to a first characteristic of the invention, the pressing of at least one batch 4 of materials to be pressed is performed by several pressure increase sequences $S_n$, constituting a pressing cycle C.

According to a characteristic of the invention, the pressing, or pressure increase sequences $S_n$, are performed during at least one given pressure stage $P_n$.

According to another characteristic of the invention, the pressing program for consecutive pressure increase sequence $S_n$, or for subsequent pressure increase sequences $S_n$, is modified.

According to another characteristic of the invention, each pressing, or pressure increase sequences $S_n$, may comprise at least one pressure stage $P_n$.

According to another characteristic of the invention, first pressure stage $P_1$ of a pressure increase sequence $S_n$ is adjustable relative to its value and/or its period.

According to another characteristic of the invention, the measurement of the rate or the amount of liquid extracted during a pressure stage $P_n$ is performed with constant pressing pressure.

According to another characteristic of the invention, pressing pressure P is modified on the basis of a rate or an amount of liquid extracted during a pressure stage $P_n$.

According to another characteristic of the invention, pressing pressure P is controlled as a function of the rate or the amount of liquid extracted during a pressure stage $P_n$.

According to an embodiment of the invention, the pressing process mainly comprises the steps of continuously measuring, during each pressure increase sequence $S_n$, at least one value depending directly on the instantaneous extracted amount of liquid, which may be variable during a pressing cycle C, comparing said amount measured at given moments and/or its variation relative to expected values, continuing or interrupting a sequence $S_n$ that is in progress as a function of the result of the preceding comparison or comparisons, repeating, optionally, the preceding operations until the end of pressing cycle C and, finally, performing, if applicable, the emptying of press 1 at the end of said pressing cycle C.

According to a preferred embodiment of the invention and as FIGS. 1 to 4 of the accompanying drawings show, the pressing process consists, more precisely, in measuring continuously and in determining, during each pressure increase sequence $S_n$, flow rate D of the extracted liquid, in comparing, then, for each pressure stage $P_n$ attained by pressing pressure P, value $D_n$ of rate D measured at a moment $t_n$ and/or relative increase $R_n$ of said rate D, resulting from the passage of pressing pressure P from a lower pressure stage $P_{n-1}$ to said pressure stage $P_n$, to corresponding predetermined values $D_1$, R, then in making pressing pressure P pass consecutively, or immediately, or after a certain period, from pressure stage $P_n$ to a higher pressure stage $P_{n+1}$, or in interrupting consecutively, after a certain period, sequence $S_n$ in progress and in performing a decompression of press 1, followed by a stirring of the materials to be pressed, as a function of the result of the comparison performed above and the value of attained pressure stage $P_n$ and in repeating, optionally, the preceding operations until the end of pressing cycle C.

At the end of pressing cycle C. press 1 can be emptied during an automatic emptying cycle or manually by the user.

According to a characteristic of the invention, the pressing of a batch 4 of materials to be pressed is begun, after the loading of press 1, only when flow rate D of liquid of said press 1 is less than a predetermined value $D_O$, thus making it possible in a first step, for the free juice to flow out. Value $D_O$ depends both on materials to be pressed and the size of press 1 used. By way of example, $D_O$ can be set advantageously at 7000 l/h for grapes and for a press 1 having a 10,000 liter capacity.

At the beginning of each pressing cycle C, it is advantageous to determine filling rate $T_r$ of tank 2 of press 1. To do this, it is sufficient to determine, in the case of a press equipped with a mobile or deformable pressing element, such as, for example, a press 1 with membrane 3, the pressurized fluid volume necessary to flatten membrane 3 of press 1 against batch 4 of materials to be pressed.

Thus, according to a characteristic of the invention, the determination of filling rate $T_r$ mainly consists in measuring, at the beginning of a pressing cycle C, the injection period of pressurized fluid necessary to attain pressure stage $P_n$ of smaller value. During the injection of the pressurized fluid, membrane 3 or the mobile pressing element of press 1 is flattened against batch 4 of materials to be pressed, the injection period being proportional to the free volume of tank 2 of press 1. The fluid supply conditions as well as the capacity of tank 2 being known, it is then possible to calculate filling rate $T_r$.

According to a variant embodiment of the invention, the determination of filling rate $T_r$ mainly consists in measuring the variation of weight at the level of tank 2 resulting from loading the latter with materials to be pressed. Actually, knowing the density of batch 4, it is possible to calculate filling rate $T_r$ for a tank 2 having a known capacity.

Figure 2:
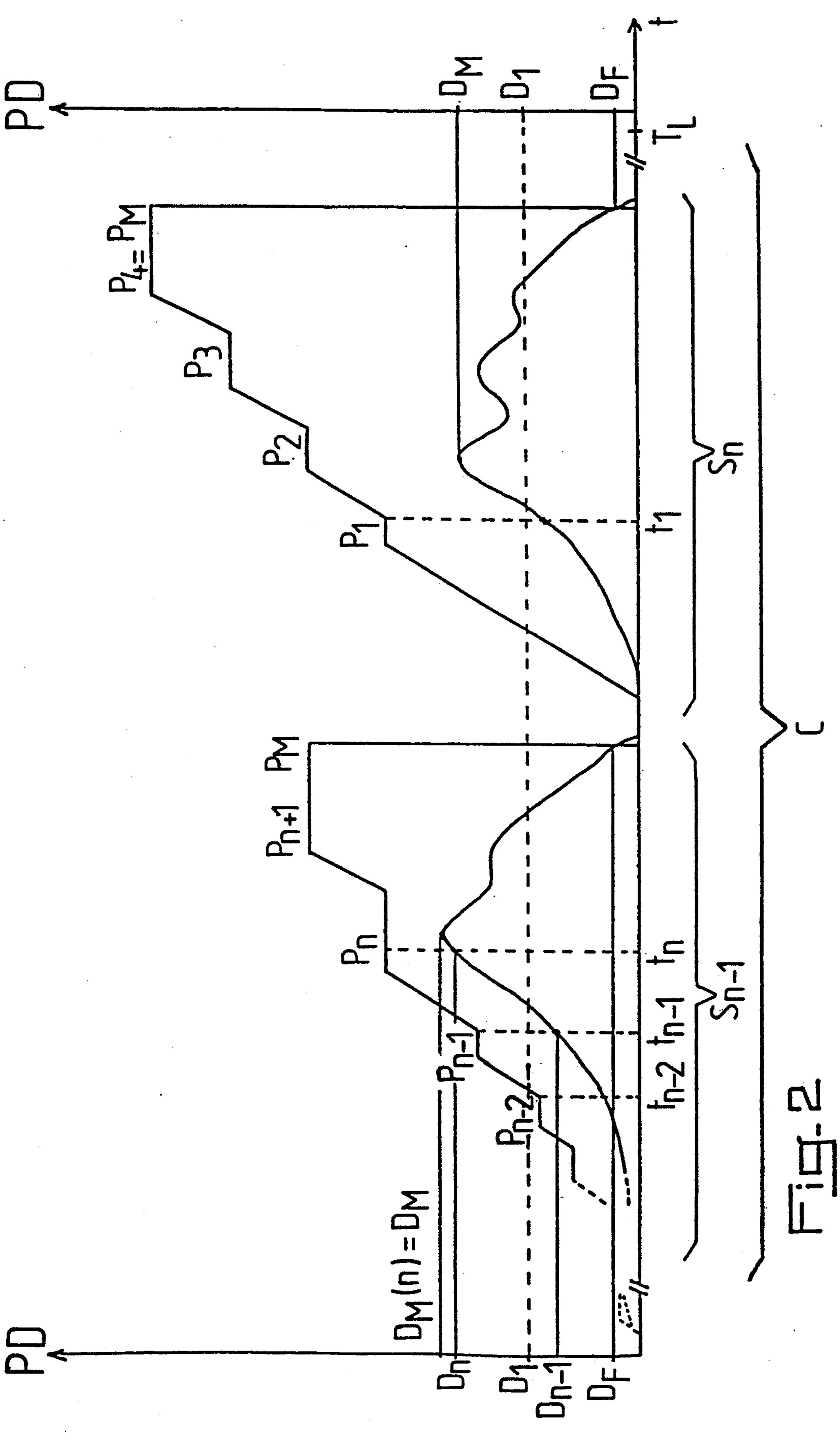
FIG. 2 represents the curves of evolution of the pressing pressure and the flow rate of the liquids extracted during two consecutive pressure increase sequences of a pressing cycle.

To accelerate the pressing operation and consequently to increase the productivity, the process according to the invention further consists, at the beginning of a pressure increase sequence $S_n$ of a pressing cycle C, in increasing successively, by stages and immediately, pressing pressure P to a pressure stage $P_n$ for which value $D_n$ of rate D measured at moment $t_n$ is greater than or equal to a value $D_1$ determined automatically at the beginning of pressing cycle C as a function, in particular, of measured filling rate $T_r$ (FIG. 2).

Pressing pressure P is therefore not held in pressure stages $P_n$ involving a rate D of low value and is immediately increased to pressure stages of higher values according to the knowledge of the result of the comparison between value $D_n$ of rate D at moment $t_n$, for each pressure stage $P_n$, and value $D_1$. The latter depends, in addition to the filling rate, also on the nature of the materials to be pressed and the size of press 1. Thus, for rapes and for a press 1 having a 10,000 liter capacity, value $D_1$ is advantageously equivalent to 400 l/h, 1100 l/h and 1700 l/h for values of filling rate $T_r$ equal, respectively, to 10%, 50% and 100%, the linear interpolation making it possible to determine all values $D_1$ as a function of $T_r$.

According to a characteristic of the invention and as FIGS. 1 and 2 of the accompanying drawings show, moment $t_n$ of measuring value $D_n$ of flow rate D of the extracted liquids is calculated from the beginning of pressure stage $P_n$ and can be set, for example, at 30 seconds from the beginning of pressure stages $P_n$ attained by pressure P.

To increase still further the speed of execution of pressing cycles C the value of first pressure stage $P_1$ of a pressure increase sequence $S_n$ is equal to the value of first pressure stage $P_n$ of a prior sequence $S_{n-1}$, for which value $D_n$ of rate D measured at moment $t_n$ was greater than or equal to value $D_1$ (FIG. 2).

Various pressure increase sequences $S_n$ are consequently modified as a function of the evolution of the pressing determined during prior pressure increase sequences $S_{n-1}$ and adapted to the new pressing conditions.

Relative to first pressure stage $P_n$, of a pressure increase sequence $S_n$, for which measured value $D_n$ is greater than $D_1$, pressing pressure P is held at said pressure stage $P_n$ until rate D drops below a value $D_T$ calculated previously. Then said pressure P is increased to higher pressure stage $P_{n+1}$.

According to a characteristic of the invention, relative increase $R_n$ of flow rate D of extracted liquids, resulting from the passage of pressing pressure P from a lower pressure stage $P_{n-1}$ to pressure stage $P_n$, is given by the following formula:

$$R_n = \frac{D_M(n) - D_m(n-1)}{D_m(n-1)}$$

where $D_M(n)$ is the maximum value of rate D determined during pressure stage $P_n$ and $D_m(n-1)$ is the minimum value of rate D, between values $D_M(n-1)$, maximum value of rate D determined during pressure stage $P_{n-1}$, and $D_M(n)$, during the passage of pressing pressure P from pressure sage $P_{n-1}$ to pressure stage $P_n$ and due to holding pressure P at level $P_{n-1}$ for a certain period, without increase. Consequently, for pressure stages $P_n$, for which measured value $D_n$ is greater than $D_1$, the selection criterion allowing the passage from pressure P to the higher stage will be the $R_n$ value, except for first held stage of $P_n$ for which $R_n$ cannot be calculated, $D_{m(n-1)}$not existing (FIG. 1).

According to another characteristic of the invention, the pressing process also consists, when the value of rate D is greater than $D_1$, in making pressing pressure P pass from a pressure stage $P_n$ to a higher pressure stage $P_{n+1}$ as soon as rate D measured during pressure stage $P_n$ has dropped below a value $D_T$ calculated for said pressure stage $P_n$, when relative increase $R_n$ of rate D is greater than or equal to corresponding predetermined value R. Actually, when $R_n$ is large and, in particular greater than a given value R, this means that the juice is freed easily from pressed materials and an additional pressure increase is then justified. On the other hand, when $R_n$ is small and, in particular, less than a given value R, this means that the liquids remain locked in the mass of the pressed materials. A new pressure increase is then useless and it is necessary to provide a decompression phase, followed by a stirring of the materials to be pressed. Value R is advantageously on the order of 5% for grapes, for example.

Value $D_T$ is advantageously determined, for each pressure stage $P_n$, by the following formula:

$$D_T = K \cdot D_M(n),$$

where K is a factor between 0 and 1, set before the beginning of pressing cycle C. Value $D_T$ therefore determines the period for holding pressure P at a pressure stage $P_n$ for which $D_n$ is greater than $D_1$ and for which $R_n$ is greater than R, when relative increase $R_n$ can be determined.

Factor K is set by the user of the press before the beginning of a pressing cycle C, as a function of the nature of the materials to be pressed and of the desired speed of execution of the pressing and the drying of batch 4.

During a pressing cycle C, several pressure increase sequences $S_n$ are generally performed, interrupted by decompression phases of press 1 and stirring of the materials to be pressed. These phases of decompression and stirring are, as already indicated above, programmed, either when relative rate increase $R_n$, for a pressure stage $P_n$, is less than given value R, or when pressure P has attained maximum pressure stage $P_n$ achievable by press 1, and are executed after a period depending on the variation of rate D during pressure stage $P_n$ in progress.

According to a characteristic of the invention, the process further consists in controlling the decompression of the press as soon as rate D drops below a fractional value $D_F$ of maximum rate $D_m$ attained during pressure increase sequence $S_n$ being considered, said fractional value $D_F$ depending on factor K set before the beginning of pressing cycle C. G is the fractional ratio of $D_F/D_M$. The following table indicates, by way of example, the value of fractional ratio G for various values of factor K, for a press 1 having a 10,000 liter capacity and used to press grapes:

| K | 0.50 | 0.55 | 0.60 | 0.65 | 0.70 | 0.75 | 0.80 | 0.85 | 0.90 |
|---|---|---|---|---|---|---|---|---|---|
| G | 0.20 | 0.25 | 0.25 | 0.30 | 0.30 | 0.35 | 0.40 | 0.45 | 0.20 |

According to another characteristic of the invention, the operation of stirring pressed materials, after decompression of tank 2 of press 1, consists in driving said tank 2 in rotation for a whole number of turns T, said number of turns T being a function, on the one hand, of pressure stage $P_M$ attained before the decompression, and on the other hand, of measured filling rate $T_r$ and, finally of value K set before the beginning of pressing cycle C. Thus, number of turns T can be calculated, for example, by the following formula:

$$T = T_1 + T_2 + T_3,$$

where $T_1$, $T_2$, $T_3$ are contributions to number of turns T depending respectively on $P_M$, K and $T_r$. The following tables indicate, by way of examples, the variations of components $T_1$, $T_2$ and $T_3$ as a function of $P_M$, K and $T_r$ and, as above, for grapes and for a press 1 having a 10,000 liter capacity:

| | | | | | | | | | | |
|---|---|---|---|---|---|---|---|---|---|---|
| $P_M$ in bars | 0.2 | 0.4 | | 0.6 | 0.8 | 1.1 | | 1.4 | 1.7 | 2.0 |
| $T_1$ in turns | 1 | 1 | | 2 | 2 | 3 | | 3 | 4 | 4 |
| K | 0.50 | 0.60 | | 0.65 | 0.70 | | 0.80 | | 0.85 | 0.90 |
| $T_2$ in turns | 1 | 1 | | 0 | 0 | | 0 | | 1 | 1 |
| $T_r$ in % | 10 | 30 | 50 | 60 | 70 | 80 | 85 | 90 | 95 | 100 |
| $T_3$ in turns | 0 | 0 | 0 | 0 | 0 | 1 | 1 | 1 | 2 | 2 |

Figure 3:
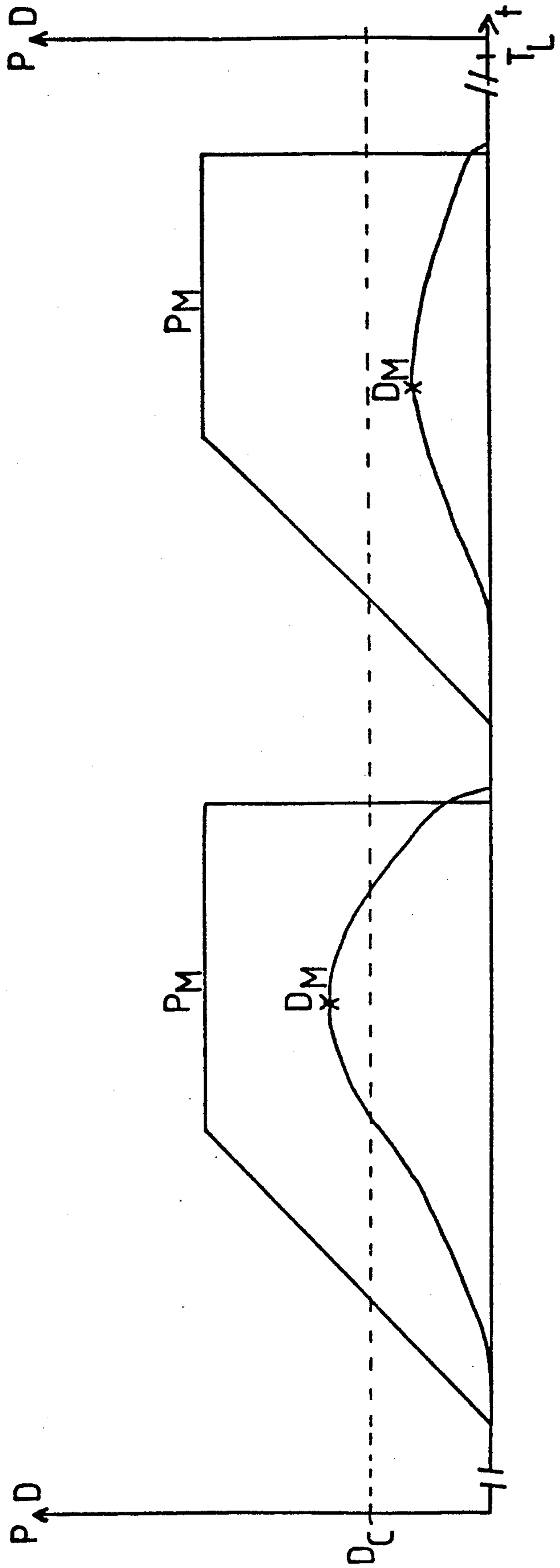
FIG. 3 represents the curves of evolution of the pressing pressure and the flow rate of the liquids extracted at the end of a pressing cycle, and, FIG. 4 is a diagrammatic representation of the device for the use of the automatic pressing process according to the invention.
Figure 4:
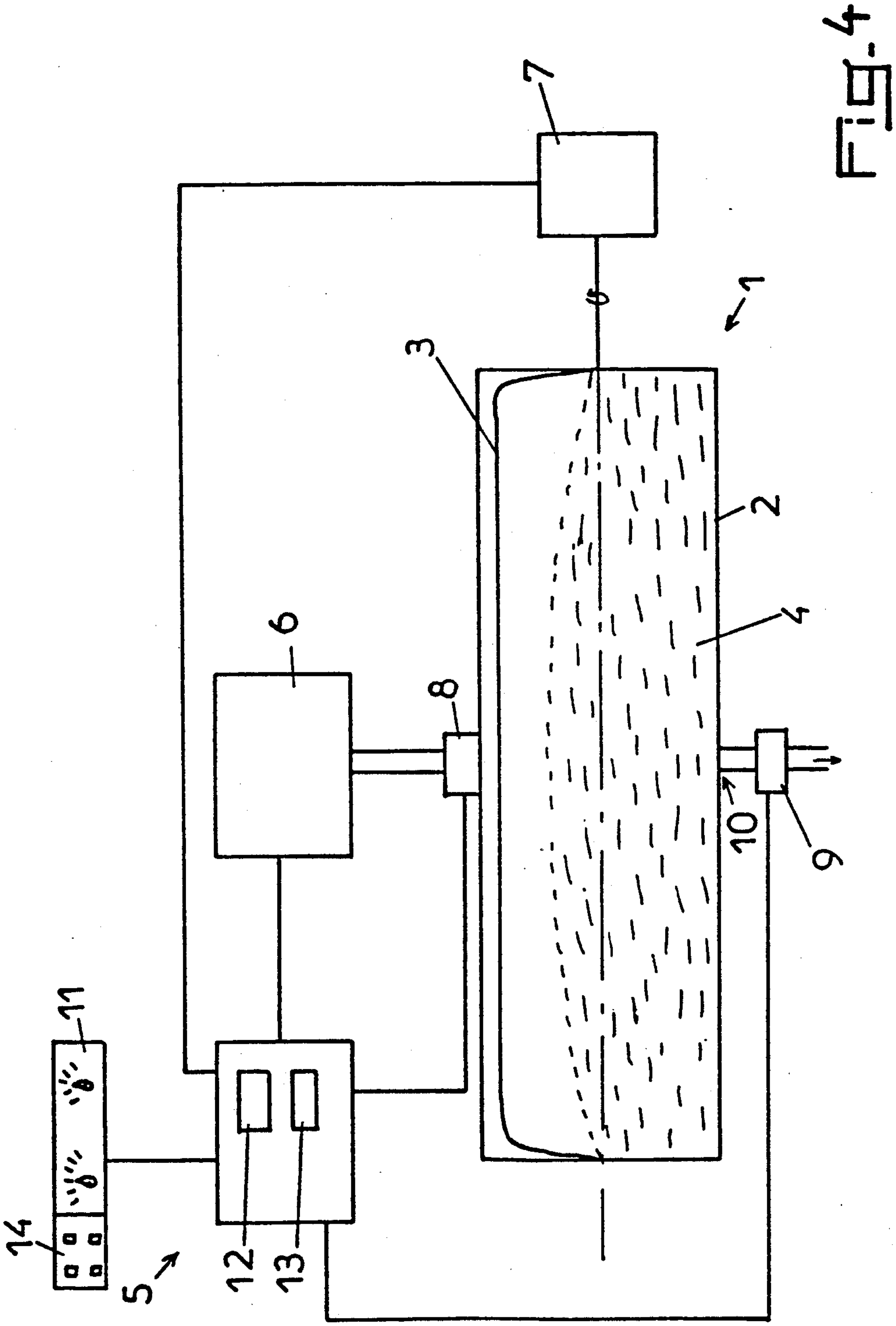

According to a characteristic of the invention, and as FIG. 3 of the accompanying drawings shows, the automatic pressing process further consists in interrupting a pressing cycle C when maximum value $D_M$ of rate D attained during a pressure increase sequence $S_n$ is less than a given critical value $D_C$ at the beginning of cycle C and depending, in particular, on filling rate $T_r$ and the capacity of tank 2 of press 1, or when the period of pressing cycle C exceeds a limit value $T_L$ set before the beginning of pressing cycle C. In the latter case, the execution of a new pressing cycle C with the same batch will be possible, while using the values determined during last pressure increase sequence $S_n$ of interrupted pressing cycle C, to modify, for example, the adjustment of factor K.

The invention also has as its object to provide a device for the use of the automatic pressing process described above, represented in FIG. 4 of the accompanying drawings. This device comprises on the one hand, a programmable automaton 5 controlling, in particular, a device 6 for supplying the press with pressurized fluid and a motor 7 for driving in rotation tank 2 of press 1, and on the other hand, a pressure sensor 8 measuring pressing pressure P and a flowmeter 9 placed downstream from orifice 10 for evacuating extracted liquids, and, finally, an operator's console 11 making it possible, in particular, to set maximum period $T_L$ of a pressing cycle C as well as the value of at least one factor K for said cycle C.

According to a characteristic of the invention, programmable automaton 5 comprises a read-only memory 12, containing the control program of the pressing process as well as the correspondence tables making it possible to determine values $D_0$, $D_1$, $D_F$, T and $D_c$ as a function of factor K set prior to pressing cycle C and values $T_r$, $D_M(n)$, $D_M$ and $P_M$ measured at the beginning or during said pressing cycle C.

According to another characteristic of the invention, programmable automaton 5 further comprises a read-write memory 13 making it possible, during a pressure increase sequence $S_n$, to process and to store momentarily the various determined values of rate D and of pressure P, and, if applicable, to keep until the end of a pressure increase sequence $S_n$ the values necessary for the determination of the following stage or stages of pressing cycle C in progress. These latter values can further be recorded in a backup memory with independent supply, making it possible to consolidate the pressing after a voluntary interruption or not.

The device according to the invention can also comprise a control panel 14 making it possible for the user to perform the emptying of tank 2 of press 1 as well as, if applicable, its evacuation.

Of course, the invention is not limited to the embodiment described and represented in the accompanying drawing. Modifications are possible, in particular from the point of view of the composition of the various elements or by substitution of equivalent techniques, without thereby going outside the field of protection of the invention.

I claim:

1. A process of juice extraction from grapes, berries, fruits, vegetables, and like agricultural products using a press having at least one pressure increase sequence to separate solids and liquids from such products and including control and adjustment of the press during juice extraction, the steps comprising supplying the products from which juice is to be extracted into a receptacle of a press and there being a pressing element in said receptacle, measuring one of the rate of extraction or the quantity of liquid extracted from the products to be pressed before, during or after pressing or the amount of partially pressed products remaining after pressing to obtain a first value thereof, comparing the measured rate, quantity or partially pressed products with corresponding predetermined second values thereof to obtain a resulting value of the difference between the corresponding first and second values, beginning, continuing, interrupting, modifying or completing the pressing operation in response to a said resulting value, the pressing process being at least partially programmed.

2. A process as claimed in claim 1 and the step of subjecting the products to be pressed to a plurality of pressure increase sequences ($S_n$) to define a pressing cycle (C).

3. A process as claimed in claim 2, wherein the plurality of pressure increase sequences ($S_n$) are performed during at least one given pressure stage ($P_n$).

4. A process as claimed in claim 1 and the step of modifying the pressing program for a subsequent pressure increase sequence ($S_n$).

5. A process as claimed in claim 1, wherein a said pressure increase sequence ($S_n$) comprises at least one pressure stage ($P_n$).

6. A process as claimed in claim 2, wherein a said pressure increase sequence ($S_n$) has a first pressure stage ($P_1$) which is adjustable in response to its value or its period of duration.

7. A process as claimed in claim 1, wherein the measuring of the rate of extraction or the quantity of liquid extracted during a pressure stage ($P_n$) is performed at a constant pressing pressure (P).

8. A process as claimed in claim 1, wherein said pressing pressure (P) is modified in response to the measured rate of extraction or quantity of liquid extracted during a pressure stage ($P_n$).

9. A process as claimed in claim 1 and the step of controlling the pressing pressure (P) as a function of the rate of extraction or amount of liquid extracted during a pressure stage ($P_n$).

10. A process as claimed in claim 1 and further comprising the steps of continuously measuring during each pressure increase sequence ($S_n$) at least one value directly responsive to the instantaneous amount of extracted liquid which varies during a pressing cycle (C), comparing the value measured at predetermined times or its relative variation with predetermined values, continuing or interrupting the existing pressure increase sequence ($S_n$) as a function of said comparison.

11. A process as claimed in claim 10, wherein the said directly responsive value comprising the flow rate (D) of extracted liquid as measured at time ($t_n$), comparing the measured flow rate (D) of extracted liquid at each pressure state ($P_n$) or relative increase ($R_n$) of said rate ($D_n$) resulting from the increase in pressure (P) from a lower pressure stage ($P_{n-1}$) to the existing pressure stage ($P_n$) with corresponding predetermined values of ($D_1$, R), increasing the pressure (P) immediately and after a predetermined period of time from existing pressure stage ($P_n$) to a higher pressure stage ($P_{n+1}$), or interrupting the sequence ($S_n$) in progress after a predetermined period of time, and decompressing the press and stirring the product therein to be pressed in response to the result of said comparison.

12. A process as claimed in claim 1, wherein after supplying products to be pressed into the press, the step of initiating the pressing when the flow rate (D) of liquid in the press is less than a predetermined value ($D_0$).

13. A process as claimed in claim 1 and the step of determining the filling rate ($T_r$) of the receptacle of the press at the beginning of a pressing cycle (C).

14. A process as claimed in claim 13, wherein the press comprises a flexible pressing element, and the step of measuring at the beginning of a pressing cycle (C) the period of injection of fluid under pressure to attain pressure stage ($P_n$) to determine the filling rate ($T_r$).

15. A process as claimed in claim 13 and the step of measuring the variation in weight of the receptacle after being supplied with products to be pressed to determine the filling rate ($T_r$).

16. A process as claimed in claim 13, wherein at the beginning of a pressure increase sequence ($S_n$) of a pressing cycle (C), the step of increasing by stages the pressing pressure (P) to a pressure stage ($P_n$) for which a measured rate of extraction ($D_n$) of liquid measured at time ($t_n$) is greater than or equal to a value ($D_1$) determined at the beginning of the pressing cycle (C) as a function of a measured filling rate ($T_r$).

17. A process as claimed in claim 11, wherein the time ($t_n$) of measuring value ($D_n$) of the flow rate of extraction of liquid is determined at the beginning of pressure stage ($P_n$).

18. A process as claimed in claim 1, wherein the value of first pressure stage ($P_1$) of a pressure increase sequence ($S_n$) is equal to the value of first pressure stage ($P_n$) of a prior sequence ($S_{n-1}$) for which value ($D_n$) of rate (D) measured at the time ($t_n$) was greater than or equal to value ($D_1$).

19. A process as claimed in claim 18, and the step of maintaining pressure (P) in a first pressure stage ($P_n$) for which measured value ($D_n$) is greater than ($D_1$) until rate (D) drops below a value ($D_T$) as previously determined, subsequently increasing the pressure (P) to a higher pressure stage ($P_{n+1}$).

20. A process as claimed in claim 19, wherein relative increase ($R_n$) of flow rate (D) of the extracted liquids, resulting from the transition of pressing pressure (P) from a lower pressure stage ($P_{n-1}$) to pressure stage ($P_n$), is given by the formula:

$$R_n = \frac{D_M(n) - D_m(n-1)}{D_m(n-1)}$$

where ($D_M$(n)) is the maximum value of rate (D) determined during pressure stage ($P_n$) and ($D_M$(n−1) is the minimum value of rate (D), between values ($D_M$(n−1), maximum value of rate (D) determined during pressure stage ($P_{n-1}$), and ($D_M$(n)), during the passage of pressing pressure (P) from pressure stage ($P_{n-1}$) to pressure stage ($P_n$).

21. A process as claimed in claim 20, wherein a flow rate (D) is greater than the flow rate ($D_1$) pressing pressure (P) is increased from a pressure stage ($P_n$) to a higher pressure stage ($P_{n-1}$) as soon as the rate (D) measured during pressure stage ($P_n$) has dropped below a flow rate ($D_T$) predetermined for said pressure stage ($P_n$) when the relative increase ($R_n$) of rate (D) is greater than or equal to corresponding predetermined value (R).

22. A process as claimed in claim 21, wherein value ($D_T$) is determined by the formula:

$$D_T = K\, D_M(n),$$

where (K) is a factor between 0 and 1, set before the beginning of the pressing cycle (C).

23. A process as claimed in claim 22, and the step of controlling the decompression of the press as soon as rate (D) drops below a fractional value ($D_F$) of maximum rate ($D_M$) attained during pressure increase sequence ($S_n$) being considered, said fractional value ($D_F$) depending on factor (K) set before the beginning of pressing cycle (C).

24. A process as claimed in claim 13, and the step of rotating the receptacle after decompression thereof through a predetermined number of turns (T), said number of turns being a function of pressure stage ($P_M$) attained before decompression, the measured filling rate ($T_r$) and of a factor (K) established before the beginning of the pressing cycle (C).

25. A process as claimed in claim 24, and the step of interrupting a pressing cycle (C) when maximum value ($D_M$) of rate (D) attained during a pressure increase sequence ($S_n$) is less than a critical value ($D_C$) determined at the beginning of cycle (C) and depending, in particular, on filling rate ($T_r$) and the capacity of tank (2) of press (1), or when the period of pressing cycle (C) exceeds a limit value ($T_L$) set before the beginning of pressing cycle (C).

26. A process as claimed in claim 11, wherein the product to be pressed is grapes and the value (R) is on the order of five percent.

27. An apparatus for the extraction of juice from grapes, berries, fruits, vegetables, and like agricultural products comprising a press having a rotatable receptacle for receiving products to be pressed and a flexible pressing element within said receptacle, means for supplying fluid under pressure to said receptacle to actuate said flexible pressing element, a motor driving to be connected to said receptacle to rotate the same, pressure sensor means within said receptacle for measuring pressing pressure of said pressing element, a discharge connected to said receptacle to evacuate extracted liquid from said receptacle, a flowmeter in said discharge to measure said extracted liquid, a programmable automatic controller connected to said means for supplying fluid under pressure and to said motor on one hand, and to said pressure sensor means and said flowmeter on the other hand, and an operator's console means for setting a time period ($T_L$) of a pressing cycle and the value of at least one factor (K) conditioning said pressing cycle.

28. An apparatus as claimed in claim 27, wherein said programmable automatic controller comprises a read-only memory in which is stored a control program for a pressing process, together with corresponding tables, to enable the determination of values ($D_0$, $D_1$, $D_F$, T, $D_c$) as a function of factor (K) established prior to a pressing cycle and of values ($T_r$, $D_M$(n), $D_M$ and $P_M$) measured at the beginning of or during a pressing cycle.

29. An apparatus as claimed in claim 28, wherein said programmable automatic controller further comprises a read-write memory to process and to store during a pressure increase sequence ($S_n$) various determined values of rate of extraction (D) and pressure (P) and to maintain until the end of a pressure increase sequence those values necessary to determine at least the subsequent stage of a pressing cycle during its progress.

* * * * *